(12) United States Patent
Zuehlke

(10) Patent No.: US 11,016,642 B2
(45) Date of Patent: May 25, 2021

(54) OPTICAL ENCODER-CONTROLLED CIRCULAR INFOTAINMENT INTERFACE

(71) Applicant: Panasonic Automotive Systems Company of America, Division of Panasonic Corporation of North America, Peachtree City, GA (US)

(72) Inventor: Sachiyo Zuehlke, Atlanta, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 16/244,625

(22) Filed: Jan. 10, 2019

(65) Prior Publication Data

US 2019/0220173 A1    Jul. 18, 2019

Related U.S. Application Data

(60) Provisional application No. 62/616,829, filed on Jan. 12, 2018.

(51) Int. Cl.
| | |
|---|---|
| *G06F 3/048* | (2013.01) |
| *B60K 35/00* | (2006.01) |
| *G06F 3/0484* | (2013.01) |
| *B60K 37/06* | (2006.01) |
| *G05G 1/08* | (2006.01) |

(52) U.S. Cl.
CPC .......... *G06F 3/04845* (2013.01); *B60K 35/00* (2013.01); *B60K 37/06* (2013.01); *B60K 2370/126* (2019.05); *B60K 2370/1537* (2019.05); *G05G 1/08* (2013.01)

(58) Field of Classification Search
CPC ..... G06G 3/048; G06F 3/048; G06F 3/04845; B60K 35/00; B60K 37/06; B60K 2370/1537; B60K 2370/126; G05G 1/08
See application file for complete search history.

(56) References Cited

U.S. PATENT DOCUMENTS

| | | | | |
|---|---|---|---|---|
| 2011/0307824 A1* | 12/2011 | Minamitani | ........... | B60K 37/06 715/781 |
| 2017/0108944 A1* | 4/2017 | Horvath | ................ | G06F 3/0362 |
| 2018/0218691 A1* | 8/2018 | Shoji | ........................ | G09G 5/00 |
| 2018/0373350 A1* | 12/2018 | Rao | ........................ | B60K 35/00 |

* cited by examiner

*Primary Examiner* — Xuyang Xia
(74) *Attorney, Agent, or Firm* — Laurence S. Roach, Esq.

(57) ABSTRACT

A user interface for an infotainment system of a motor vehicle includes a rectangular display screen and a rotatable ring having a central circular viewing window through which the display screen is visible. The rotatable ring includes a plurality of rotational positions relative to the display screen. An optical switch is disposed between the rotatable ring and the display screen and detects the rotational position of the rotatable ring. An electronic processor is communicatively coupled to the display screen and to the optical switch. The electronic processor controls an image presented on the display screen dependent upon the rotatable position of the rotatable ring as detected by the optical switch.

6 Claims, 3 Drawing Sheets

OPTICAL ENCODER-CONTROLLED CIRCULAR INFOTAINMENT INTERFACE

CROSS-REFERENCED TO RELATED APPLICATIONS

This application claims benefit of U.S. Provisional Application No. 62/616,829 filed on Jan. 12, 2018, which the disclosure of which is hereby incorporated by reference in its entirety for all purposes.

FIELD OF THE INVENTION

The disclosure relates to a user interface for an infotainment system in a motor vehicle.

BACKGROUND OF THE INVENTION

Conventional automotive infotainment interfaces typically include a large number of pushbuttons and knobs, which makes the interfaces difficult to become familiar with, and which thus may distract the driver from the driving task.

Round or circular display screens are becoming available. However, it is expensive to develop a custom round display screen.

SUMMARY

The present invention may provide an infotainment interface that is controlled only by a large ring knob.

In one embodiment, the invention comprises a user interface for an infotainment system of a motor vehicle, including a rectangular display screen and a rotatable ring having a central circular viewing window through which the display screen is visible. The rotatable ring includes a plurality of rotational positions relative to the display screen. An optical switch is disposed between the rotatable ring and the display screen and detects the rotational position of the rotatable ring. An electronic processor is communicatively coupled to the display screen and to the optical switch. The electronic processor controls an image presented on the display screen dependent upon the rotatable position of the rotatable ring as detected by the optical switch.

In another embodiment, the invention comprises a user interfacing method for a motor vehicle, including providing a rotatable ring having a central circular viewing window through which a display screen is visible, and a plurality of rotational positions relative to the display screen. An optical switch is provided between the rotatable ring and the display screen. The rotational position of the rotatable ring is detected by the optical switch. An image presented on the display screen is controlled dependent upon the rotational position of the rotatable ring as detected by the optical switch.

In yet another embodiment, the invention comprises a user interface for an infotainment system of a motor vehicle. The user interface includes a rectangular display screen, and a rotatable ring having a central circular viewing window through which the display screen is visible. The rotatable ring includes a plurality of rotational positions relative to the display screen. An optical switch is disposed between the rotatable ring and the display screen. The optical switch detects the rotational position of the rotatable ring. A push switch is disposed between the rotatable ring and the display screen.

An advantage of the present invention is that it may reduce the number of pushbuttons that a driver needs to operate while driving, which simplifies operation and increases safety.

Another advantage of the present invention is that it may inexpensively provide flexibility in display configurations.

Yet another advantage is that the illusion of a round display created by the ring knob can be applied to any display size. Thus, the development cost of the display is significantly lower than with a conventional custom round display.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
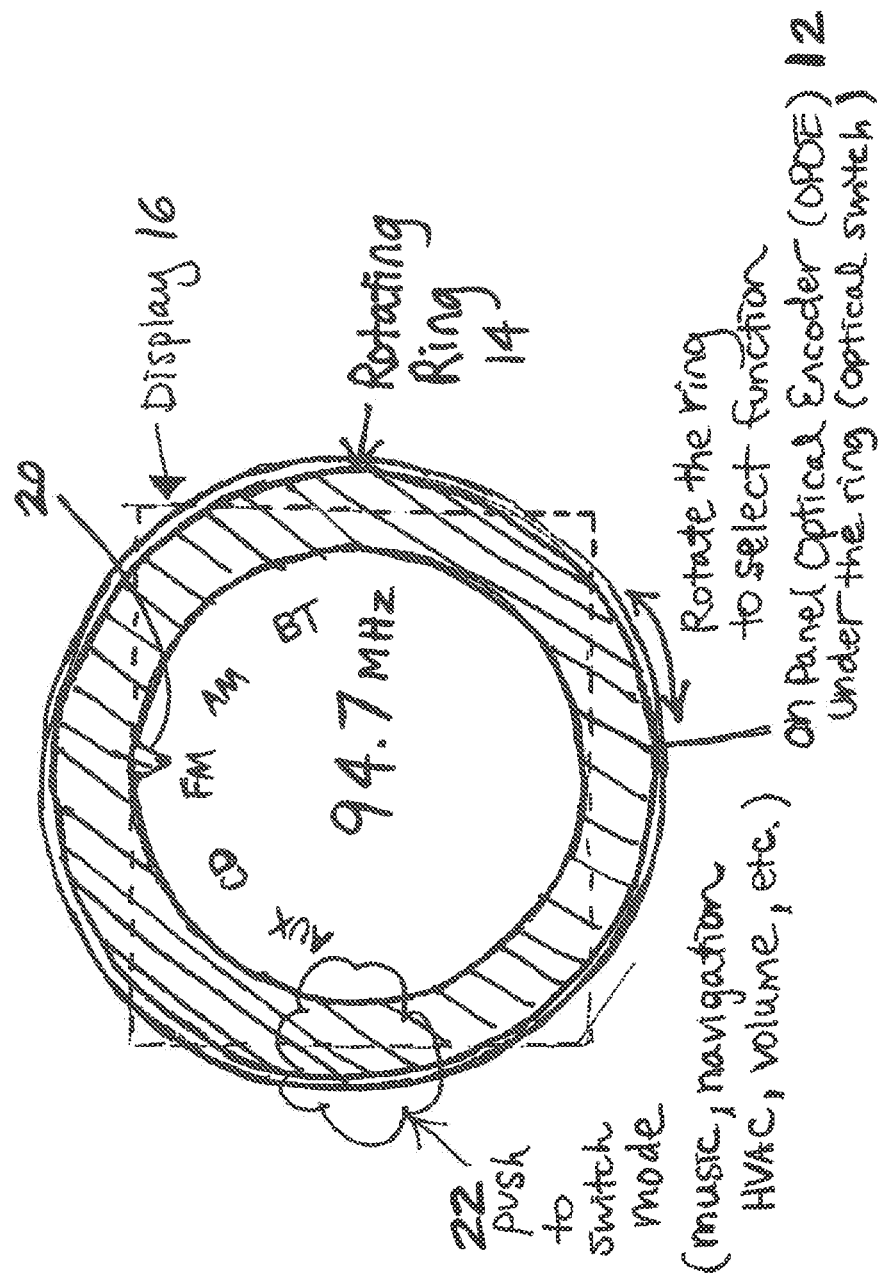
FIG. 1 is a plan view of one embodiment of a user interface of the present invention for a motor vehicle infotainment system.

FIG. 1 illustrates one example embodiment of a user interface 10 of the present invention for an infotainment system of a motor vehicle. Interface 10 includes an on panel optical encoder (OPOE) 12, which is a type of optical switch, sandwiched between a rotatable ring 14 and a rectangular display screen 16. For ease of illustration, OPOE 12 is shown with a diameter that is slight larger than the diameter of ring 14. However, OPOE 12 may also have a diameter that is equal to or less than the diameter of ring 14.

As is known, OPOE 12 may have one or more internal light sources that reflect light off of reflecting and non-reflecting sections that alternate in a circumferential direction around ring 14. By measuring the light reflected from the reflecting and non-reflecting sections, OPOE 12 may detect the rotational position of ring 14. However, it is to be understood that any sensor that detects the rotational position of ring 14 may be used within the scope of the invention.

A pointed indicator 20 on ring 14 may indicate a current selection that is determined by the rotational position of ring 14. In the example illustrated in FIG. 1, indicator 20 indicates that "FM" radio is currently selected as the audio source or music source, among the other possible selections of an auxiliary source ("AUX"), compact disc ("CD"), "AM" radio, and Bluetooth ("BT").

By virtue of operation of OPOE 12, display 16 can be controlled by rotating ring 14. Display 16 may display information that corresponds to the current selection of ring 14. In the example illustrated in FIG. 1, the currently tuned to frequency of 94.7 MHz in the currently selected FM radio band is displayed by display 16.

A push switch or pushbutton 22 can also be embedded under ring 14 to enable mode switching. In the example illustrated in FIG. 1, the current mode is "music", but other modes that may be switched to are "navigation", "HVAC", and "volume", among others.

Display 16 can be any traditional rectangular shaped display, but the use of large ring knob 14 may create an illusion that display 16 is also round. Display 16 can be touch sensitive to enable a user to make other selections by touching display 16.

Figure 2:
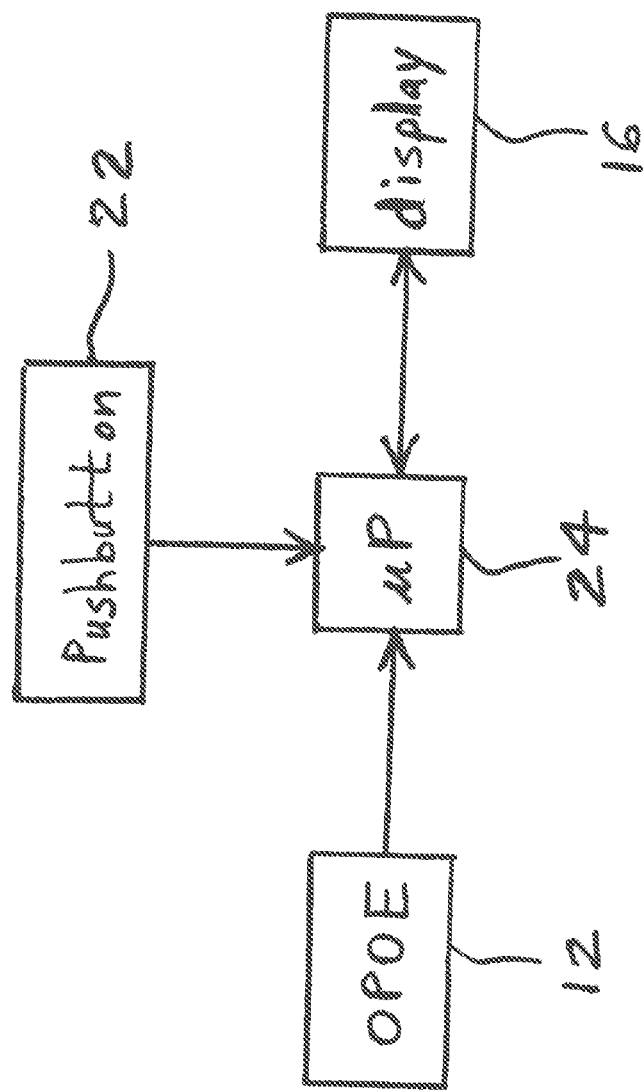
FIG. 2 is a block diagram of the user interface of FIG. 1.

FIG. 2 illustrates the electronics associated with user interface 10. An electronic processor 24 is communicatively coupled to OPOE 12, display screen 16 and pushbutton 22. Processor 24 may control what is presented on display 16 depending upon inputs that processor 24 receives from OPOE 12 and pushbutton 22.

Figure 3:
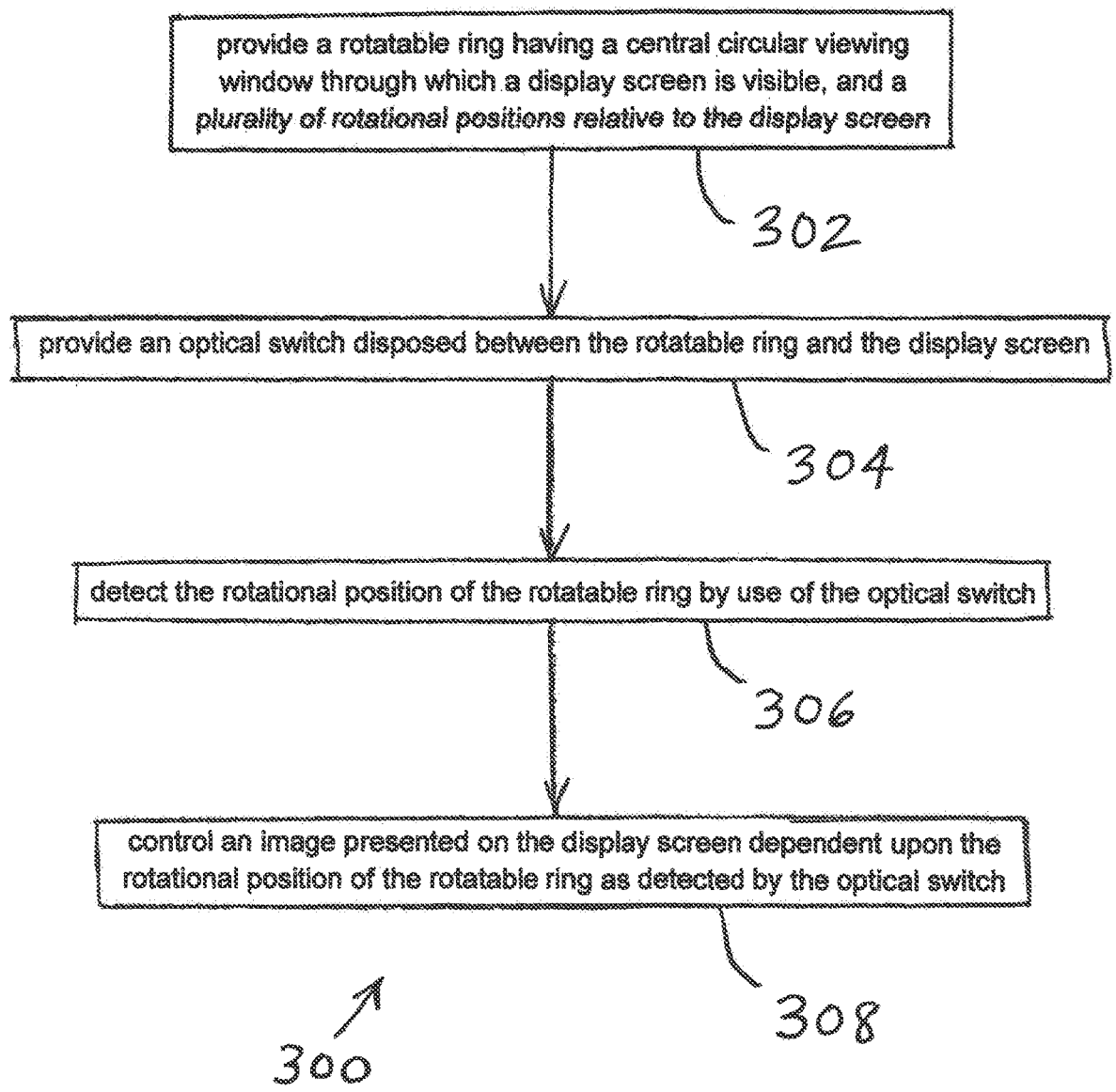
FIG. 3 is a flow chart of one embodiment of a user interfacing method of the present invention for a motor vehicle.

FIG. 3 illustrates one embodiment of a user interfacing method 300 of the present invention for a motor vehicle. In a first step 302, a rotatable ring is provided having a central circular viewing window through which a display screen is visible, and a plurality of rotational positions relative to the display screen. For example, rotatable ring 14 has a central circular viewing window through which display screen 16 is visible, and a plurality of rotational positions relative to display screen 16.

Next, in step 304, an optical switch is provided between the rotatable ring and the display screen. For example, on panel optical encoder 12 is disposed between ring 14 and display screen 16.

In a next step 306, the rotational position of the rotatable ring is detected by use of the optical switch. For example, by measuring the light reflected from the reflecting and non-reflecting sections, OPOE 12 may detect the rotational position of ring 14.

In a final step 308, an image presented on the display screen is controlled dependent upon the rotational position of the rotatable ring as detected by the optical switch. For example, by virtue of operation of OPOE 12, display 16 can be controlled by rotating ring 14. Display 16 may present information that corresponds to the current selection and rotational position of ring 14. Processor 24 may control what is presented on display 16 depending upon inputs that processor 24 receives from OPOE 12.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. An infotainment system of a motor vehicle, the infotainment system comprising:
   a rectangular display screen;
   a rotatable ring having:
      a central circular viewing window through which the display screen is visible; and
      a plurality of rotational positions relative to the display screen;
   an optical switch disposed between the rotatable ring and the display screen and configured to detect the rotational position of the rotatable ring; and
   an electronic processor communicatively coupled to the display screen and the optical switch, the electronic processor being configured to:
      control an image presented on the display screen dependent upon the rotational position of the rotatable ring as detected by the optical switch;
      associate each rotational position of the rotatable ring with a respective infotainment system function selected by a human user and put the function into effect in response to sensing the rotational position of the rotatable ring,
      wherein the rotatable ring includes an indicator configured to indicate which of displayed infotainment system functions is currently selected by the human user; and
   a push switch disposed between the rotatable ring and the display screen and communicatively coupled to the electronic processor, the electronic processor being configured to:
      change a mode of the infotainment system and the image presented on the display screen in response to the push switch being pushed by the human user.

2. The infotainment system of claim 1 wherein the electronic processor is configured to present on the display screen a plurality of infotainment system functions available for selection by the human user.

3. The infotainment system of claim 1 wherein a diameter of the central circular viewing window is at least as large as a width of the display screen and is at least as large as a length of the display screen.

4. A user interfacing method for a motor vehicle, the method comprising:
   providing a rotatable ring having:
      a central circular viewing window through which a display screen is visible; and
      a plurality of rotational positions relative to the display screen;
   providing an optical switch disposed between the rotatable ring and the display screen;
   detecting the rotational position of the rotatable ring by use of the optical switch;
   controlling an image presented on the display screen dependent upon the rotational position of the rotatable ring as detected by the optical switch;
   associating each rotational position of the rotatable ring with a respective infotainment system function selected by a human user;
   putting the respective infotainment system function into effect in response to sensing the rotational position of the rotatable ring, wherein the rotatable ring includes an indicator indicating which of displayed infotainment system functions is currently selected by the human user;
   providing a push switch disposed between the rotatable ring and the display screen; and
   change a mode of the infotainment system and the image presented on the display screen in response to the push switch being pushed by the human user.

5. The user interfacing method of claim 4 further comprising presenting on the display screen a plurality of infotainment system functions available for selection by the human user.

6. The user interfacing method of claim 4 wherein a diameter of the central circular viewing window is at least as large as a width of the display screen and is at least as large as a length of the display screen.

* * * * *